Dec. 20, 1955  W. M. TOMKINS  2,727,641
CAN BAG UNLOADING APPARATUS
Filed Aug. 26, 1949  7 Sheets-Sheet 1

Inventor,
Walter M. Tomkins.
Mason, Porter, Diller & Stewart
Attys.

Fig. 4.

Dec. 20, 1955 W. M. TOMKINS 2,727,641
CAN BAG UNLOADING APPARATUS
Filed Aug. 26, 1949 7 Sheets-Sheet 3

Inventor
Walter M. Tomkins

Dec. 20, 1955  W. M. TOMKINS  2,727,641
CAN BAG UNLOADING APPARATUS
Filed Aug. 26, 1949  7 Sheets-Sheet 4

Inventor,
Walter M. Tomkins.
Mason, Porter, Diller & Stewart
Attys.

United States Patent Office 2,727,641
Patented Dec. 20, 1955

2,727,641

CAN BAG UNLOADING APPARATUS

Walter M. Tomkins, Hinsdale, Ill., assignor to Continental Can Company, Inc., New York, N. Y., a corporation of New York Application August 26, 1949, Serial No. 112,565

11 Claims. (Cl. 214—307)

The invention relates generally to the art of manufacturing cans and primarily seeks to provide a novel apparatus for unloading cans from the bags in which they are packaged for storage and distribution to the market.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the cost of handling manufactured cans is greater than the cost of manufacturing the cans. For example, it has long been the practice to hand fork the cans into the cars by which they are transported, and from said cars or conveyor means into storage bins. This can handling practice presented many problems such as the necessity of employing workers skilled in the forking of cans, of providing runways, or cableways to the cars and from the cars to storage bins, and of providing special, space consuming bins, not to speak of the necessity of so handling the cans seasonally, with resulting shortage of cars. Some progress has been made in relieving these conditions by packaging the cans in bags for shipment and storage, and some novel methods of and apparatus for so packaging the cans have been devised. These last mentioned methods of packaging the cans in bags or self-contained units provide marked advantages because no special skill is required in handling the bags, no special storage space is required and the can bags can be handled, loaded and unloaded, as unit packages, rapidly and without the need of using individual can runways or cableways. Moreover, the packaging of the cans in bags permits storage in advance of season, a very valuable asset in relieving car shortage. However, in order to derive full benefit from the packaging of cans in bags, efficient methods and apparatus for unloading the cans from the bags must be made available so as to make cans in such packages practical and attractive to the customer. It is the purpose of the present invention to provide a novel and efficient apparatus for unloading the cans from the bags in which they are packaged, shipped and stored.

Another object of the invention is to provide a novel apparatus for practicing a can bag unloading method of the character stated.

Another object of the invention is to provide an apparatus for unloading cans from a bag wherein the cans are arranged in multiple independent tiers and with their axes in parallel generally horizontal relation and comprising a receiver in which to receive the bag of cans and having a wall opening through which the sides of cans of the several tiers are exposed by removal of at least a portion of the bag, and wall opening closure means normally closing over said wall opening to retain cans within the receiver, said closure means being progressively removable to release the cans to pass by gravity action through the wall opening one tier at a time.

Another object of the invention is to provide an apparatus of the character stated including a conveyor for receiving the individual tiers of cans and discharging them as they pass out by gravity action from the receiver wall opening, and means for placing the conveyor to receive the successively released tiers of cans.

Another object of the invention is to provide an apparatus of the character stated wherein the conveyor placing means includes means constantly tending to move the conveyor in one direction along the receiver wall opening, means for stopping the conveyor in alignment with each tier of cans, and means controlled by movement of cans through the conveyor for releasing the successively effective stops to permit the conveyor to move on to the next can tier registration after the last can of the preceding can tier has been discharged thereinto.

Another object of the invention is to provide in apparatus of the character stated novel means controlled by movement of the conveyor for bringing about the progressive removal of the wall opening closure means and the successive release of the can tiers.

Another object of the invention is to provide an apparatus of the character stated wherein the receiver is tiltably mounted so as to be movable between a can bag receiving position in which the wall opening is directed upwardly to facilitate bag placement and the removal of the bag portion for exposing can sides, and a can discharging position in which said opening is directed downwardly to facilitate the discharging of the cans by gravity action.

Another object of the invention is to provide an apparatus of the character stated wherein the receiver wall closure means comprise individual tier retaining gate members swingably supported on the receiver and traversing the wall opening and which constantly tend to swing open when the receiver is in the can discharging position, there being included latch means for holding each gate member in closed position, and latch releasing means movable with the conveyor and effective as the conveyor comes to rest in registry with a given tier of cans to release the gate member which holds that particular tier of cans from discharging through the receiver wall opening.

Another object of the invention is to provide an apparatus of the character stated wherein the stop means for placing the conveyor in registry with the several tiers of cans comprises a lower pivoted stop detent associated with each can tier position and engageable as a stop by the conveyor when moving in one direction and displaceable by said conveyor when moved in the opposite direction, and an upper fixed stop overlying and spaced slightly beyond each lower stop, a latch arm pivotally mounted on the conveyor in position for engaging with said lower and upper stop sets, and means on the conveyor in position for being engaged by cans being discharged therethrough and connected with the latch arm for lifting the same out of contact with a lower stop and into conveyor stopping contact with the associated upper stop, and for allowing the latch arm to fall down on and slide freely over the respective lower stop as the last can of the tier being discharged passes on in the conveyor to free said latch arm from both the upper and lower stops of the particular set and permit the conveyor to move on into register with the next tier of cans.

Another object of the invention is to provide an apparatus of the character stated in which the conveyor includes a chute of a width for receiving only one can length and mounted on rollers rollable over supporting tracks, said chute having a receiving mouth movable along the receiver wall opening in close proximity for receiving cans therefrom.

With the above and other objects in view that will hereinafter appear, the nature of the invention will be more clearly understood by reference to the following detailed description, the appended claims and the several views illustrated in the accompanying drawings.

Figures 1, 2, 3:
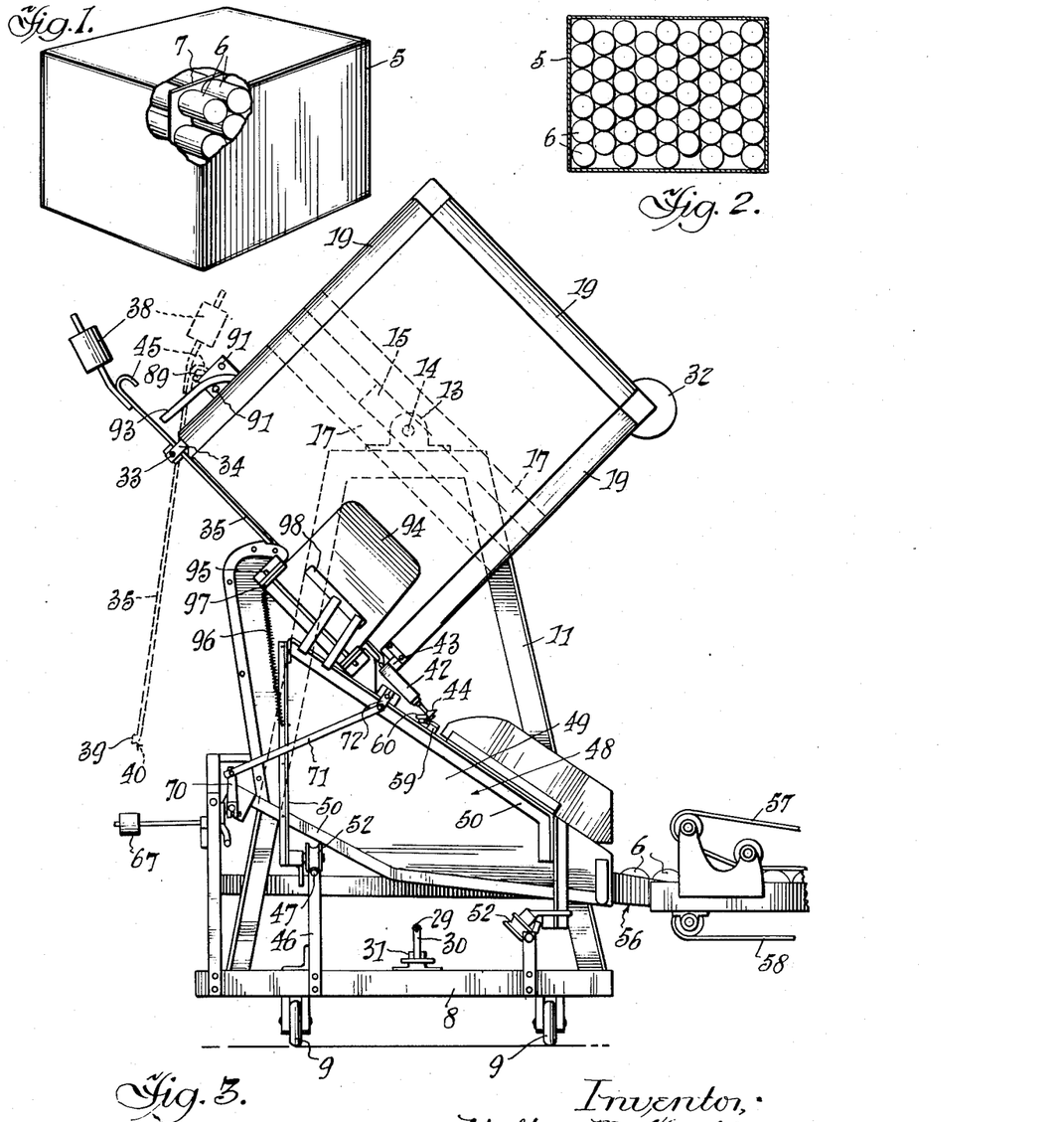
Figure 1 is a perspective view illustrating a bag of cans of the type intended to be unloaded in the apparatus of the present invention, a portion of one corner of the bag being broken away so as to expose some of the cans therein.
Figure 2 is a vertical cross section taken through the bag of cans shown in Figure 1.
Figure 3 is a front end elevation illustrating the improved bag unloading apparatus.

In the example of embodiment of the invention herein disclosed, the improved apparatus have to do with the unloading of bags of cans such as are shown in Figures 1 and 2 whereby the bags 5 formed of paper are shown as containing multiple tiers of cans 6, the several tiers being separated by tier sheets 7 in the usual manner.

One example of apparatus is illustrated and it includes a frame base 8 which may be supported on wheels 9 for the purpose of easy handling. From one end of the base 8 two frame standards 10 and 11 arise, and on these standards are mounted bearings 12 and 13 in the manner best illustrated in Figures 1, 3, 5 and 6 of the drawings. The bearings serve to rockably support a stub shaft 14 which carries a cross head 15 to which is fixed a head plate 16, reinforcing angles 17 also being employed. The head plate provides the inner end of a receiver which is rectangular in cross section and is defined by the side walls 18, three of which are flared at the front or receiving end and are reinforced by angle pieces 20. The fourth side wall has a long opening 21 formed therein, and through this opening the cans being unloaded from the bags are discharged in a manner to be described hereinafter.

Figure 4:
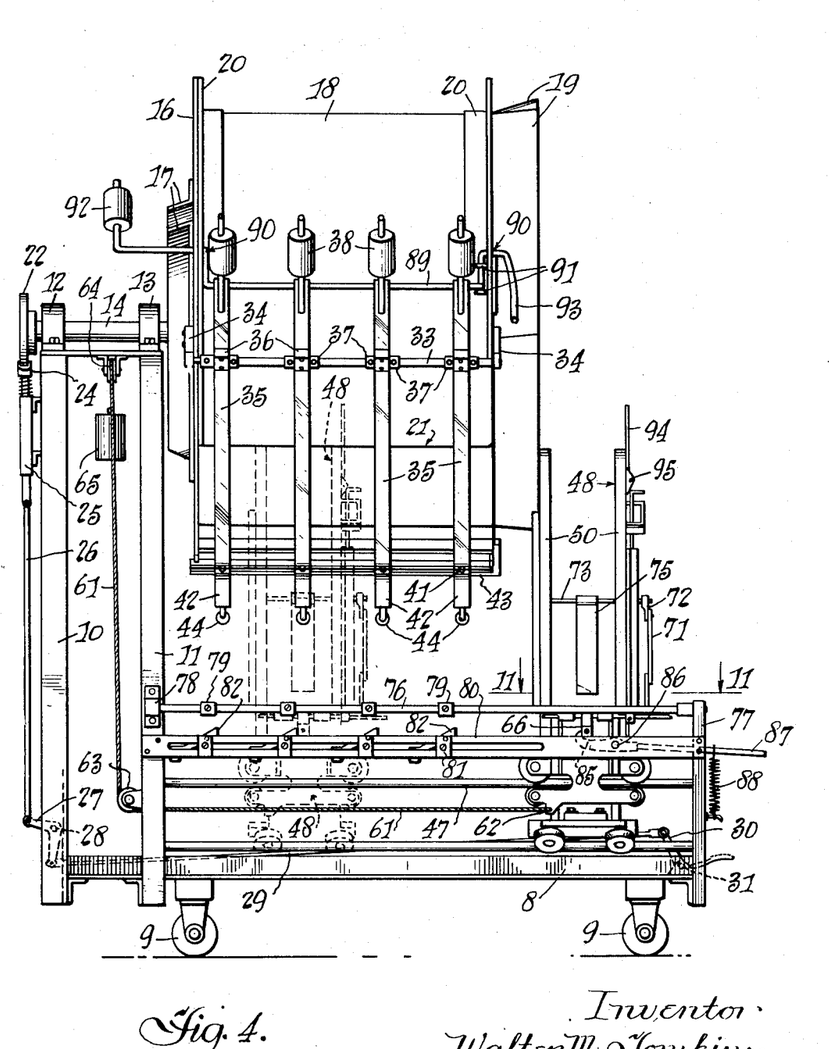
Figure 4 is a left side elevation of the apparatus shown in Figure 3, the carriage being shown in the fully retracted position in full lines, and as having been shifted over to the third can tier discharging position in dotted lines.
Figure 5:
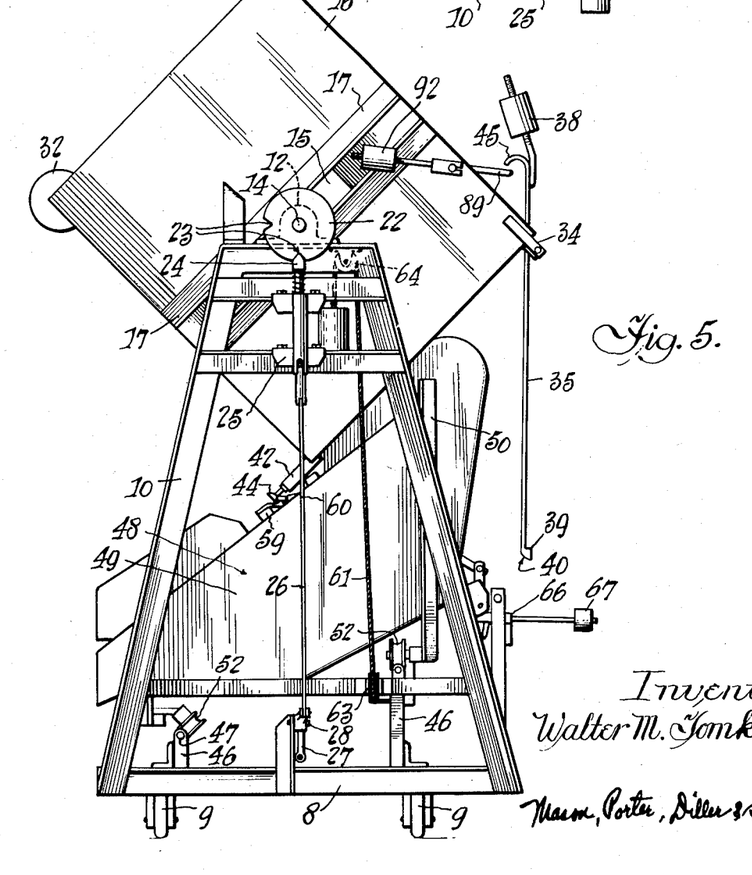
Figure 5 is a rear end elevation of the apparatus, the bag receiver being shown as swung down to its operative position, and the discharge gates being shown as swung into the open position.
Figure 6:
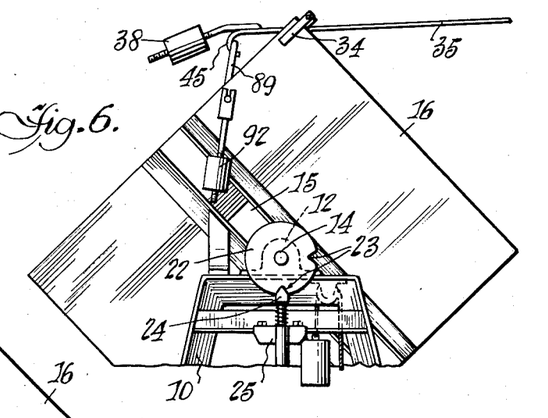
Figure 6 is a fragmentary rear end elevation of the bag receiver and its mounting, said bag receiver being shown as swung up to its bag receiving position, and the discharge gates being shown as held in the open position.

A disk 22 secured on the shaft 14 is equipped with two detent receiving notches 23 which are spaced 90° apart in the manner clearly illustrated in Figures 5 and 6. The disk notches are adapted to receive the spring pressed detent 24 which is mounted as at 25 on the frame standard 10. The detent serves to yieldably hold the receiver in its bag receiving position in which the discharge opening 12 is directed upwardly as in Figures 6, 8 and 9, or in its can discharging position in which said opening is directed downwardly as in Figures 3, 4, 5, 7, 10, 13 and 17. The detent 24 is connected by a link 26 with one arm of a bell crank lever 27 which is pivoted as at 28 on the frame standard 10. See Figures 4 and 5. The other arm of the bell crank lever 27 is connected by a link 29 with the bell crank treadle 30 which is pivotally supported as at 31 on the frame base at the front of the apparatus. See Figure 4. By depressing the treadle 30 the detent 24 can be depressed to free the disk 22 and the receiver can be readily swung from one to the other of its receiving and discharging positions. In order to facilitate the manual swinging of the receiver, a counterweight 32 is secured to one corner thereof.

A cross rod 33 is secured as at 34 to the reinforcing angles 20 at one corner of the receiver. See Figures 3 and 4. Gate bars 35 are pivoted as at 36 on the rod 33 between spaced collars 37, one such gate being disposed opposite the position of each tier of cans when a bag of cans is placed in the receiver. In the interest of simplicity only four gate bars 35 are shown, thus to control the discharging of four tiers of cans from a bag. It is to be understood, however, that the number of gate bars 35 will vary as the number of tiers of cans in the bags varies, and obviously the number of tiers included in the bags will depend upon the height of the cans packaged therein. Counterweights 38 are adjustably secured to the upper ends of the gate bars 35 and are effective to approximately balance said bars. It is to be understood, however, that the bars will always tend to gravitate to the open position shown in dotted lines in Figure 3 and in full lines in Figure 7 when the receiver is in its can discharging position, and to the generally horizontal and open position illustrated in full lines in Figures 6 and 8 when the receiver is in the bag receiving position. Latch heads 39 are provided at the lower ends of the gate bars 35, and each has an inwardly directed cam surface 40, the purpose of which will become apparent as the description progresses.

The latch heads at the lower ends of the gate bars 35 are engageable with spring projected latches 41, one thereof being provided for each gate bar, and each being yieldably mounted in a housing 42 mounted on the bar 43 which is supported by the reinforcing angles 20 on the receiver. In addition to being projected from the housings 42 for engagement with the gate bar latch heads 39, the latches 41 are projected beyond the housings at their opposite ends and carry trip heads 44, the purpose of which will be described hereinafter. It will be noted by reference to Figures 3, 5, 6 and 7 that the gate bars also are equipped at their upper ends with hook shaped extensions 45, and the purpose of these extensions will be described hereinafter.

By reference to Figures 3, 4, 5, 13 and 18 it will be apparent that supporting uprights 46 rising from the base frame serve as supports for a pair of guide rails 47 which in turn serve as guides and supports for the shiftable conveyor or carriage generally designated 48 through which the cans are discharged, tier-after-tier, from the receiver when the same is positioned in the manner illustrated in Figures 3, 4, 5, 7, 10, 13 and 17 of the drawings.

Figure 12:
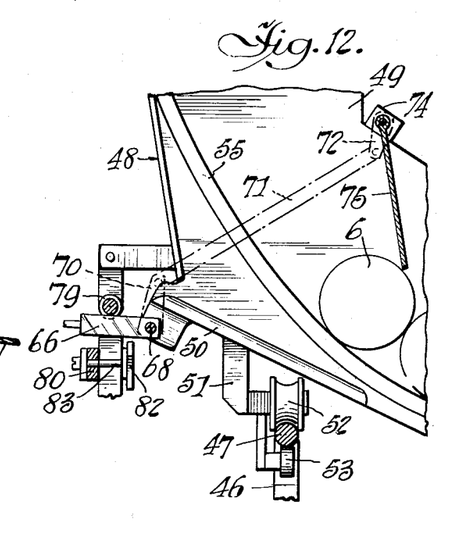
Figure 12 is a fragmentary vertical cross section taken through the center of the shiftable can tier discharging carriage and showing the outrunning cans in the process of holding the latch arm up against one of the carriage position retaining stops.

The shiftable conveyor generally designated 48 is composed of side plates 49 arranged in parallel relation and spaced apart a distance slightly greater than the height of the cans being unloaded from the bags. The plates are held in proper spaced relation and reinforced by suitable framing 50 including depending supports 51 on which are mounted the supporting rollers 52 and the keeper rollers 53 which engage the previously mentioned guide rails 47. It will be apparent by reference to Figures 3, 5 and 13 of the drawings that the receiving mouth 54 of the conveyor or carriage is disposed in close proximity to the wall opening 21 when the receiver is in its can discharging position. The walls or the side plates 49 of the conveyor are equipped with runners 55 on which the cans 6 roll as they are being discharged from the receiver through the conveyor in the manner illustrated in Figures 12 and 13, and said runners deliver the cans onto a chute 56, and from thence between upper and lower feed-away belts 57 and 58 in the manner best illustrated in Figures 3 and 17.

Figures 13, 14:
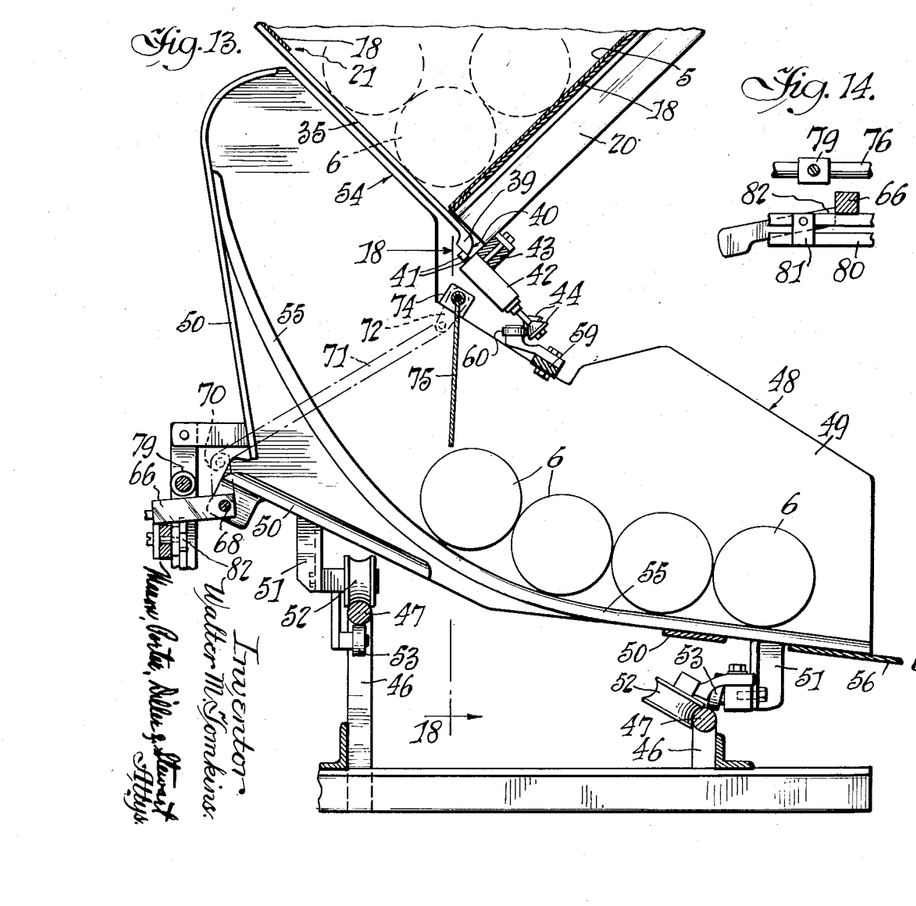
Figure 13 is a view similar to Figure 12, the control gate being released by the passing of the last can and the latch arm being lowered for engagement with the next lower stop about to be engaged by the carriage, and the discharge gate being in the process of being released to discharge the next tier of cans as the carriage fully engages said next lower stop.
Figures 14, 15 and 16 are detail fragmentary sectional views respectively illustrating three positions of the latch arm, the first being the interception of the carriage by engagement of the latch arm with one of the lower stops, the second being the engagement of the latch arm with the cooperating upper stop, the latch arm having been lifted by the outrunning cans, and the third being the riding of the latch arm on and over the lower stop, it having been lowered onto said lower stop incidental to the passing of the last can of the tier beneath the control gate.
Figure 15:
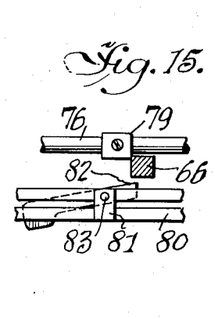
Figure 16:
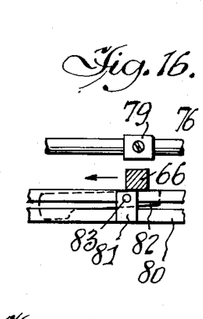
Figure 17:
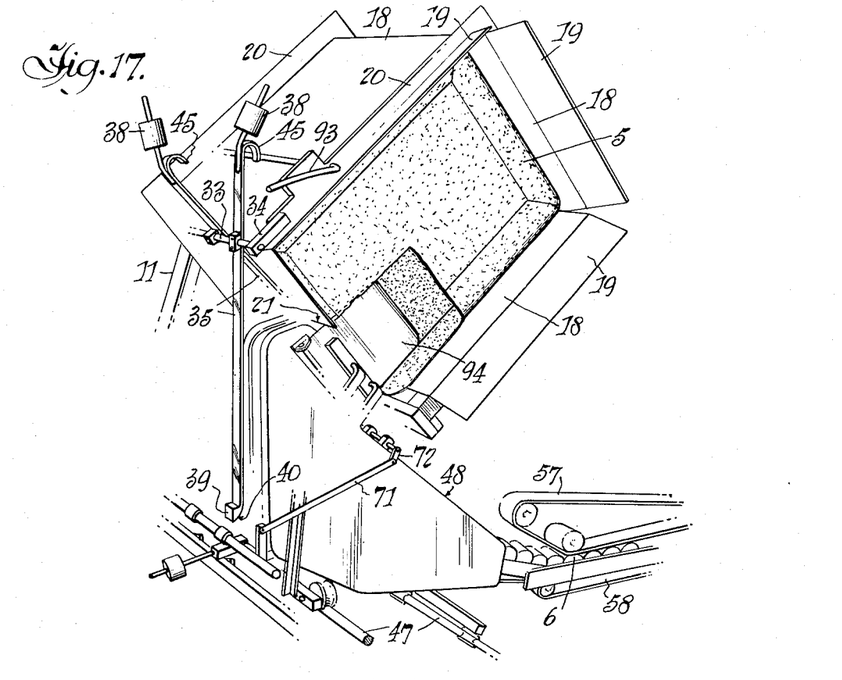
Figure 17 is a view similar to Figure 10, one discharge gate being shown in the released position and one tier of cans having been discharged from the bag.

A bar 59 is secured across the tops of the conveyor sides 49 and to it is affixed the latch tripping roller 60 in the manner clearly illustrated in Figures 3 and 13.

Figures 18, 19, 20:
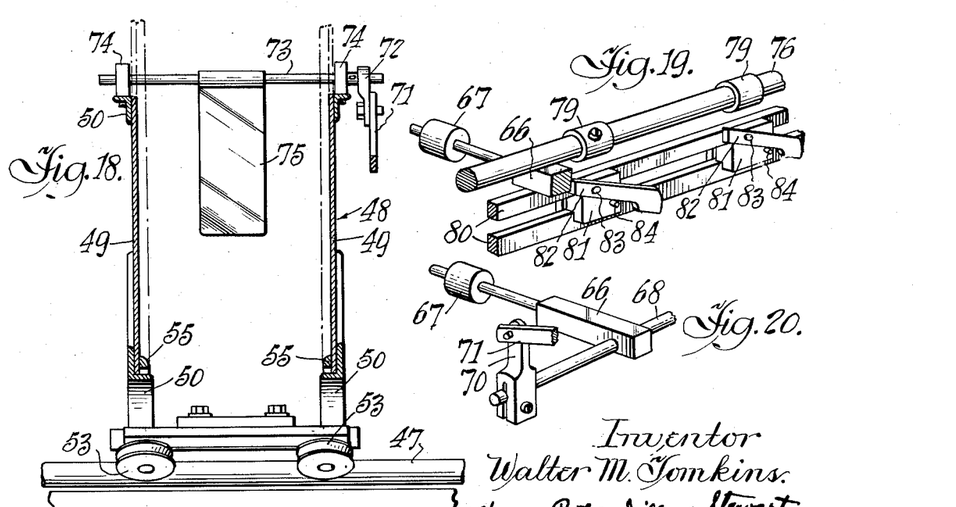
Figure 18 is a fragmentary vertical cross section taken on the line 18—18 on Figure 13.
Figure 19 is a fragmentary perspective view illustrating the latch arm position shown in Figure 14.
Figure 20 is a fragmentary perspective view illustrating the latch arm.

A cable 61 is connected as at 62 to the conveyor or carriage 48 in the manner clearly illustrated in Figures 4 and 5 of the drawings, and said cable passes upwardly over a lower guide 63 and downwardly over an upper guide 64 and has attached thereto a counterweight 65 which constantly tends to move the conveyor or carriage 48 to the left as viewed in Figures 4 and 18.

Attention is directed to Figures 4, 11, 12, 13, 19 and 20 in which it will be observed that a latch arm 66 counterweighted as at 67 is secured to a rocker shaft 68 which is pivoted as at 69 on the conveyor or carriage 38. A crank arm 70 is secured to the shaft 68 and is connected by a link 71 with a crank arm 72 secured on a second rock shaft 73. The rock shaft 73 is rockably mounted as at 74 at the top portion of the conveyor or carriage. See Figures 3 and 18. It will also be noted that a latch arm trip plate 75 is secured to and depends from the rock shaft 73 between the side plates 49 of the conveyor or carriage 48. The purpose of this trip plate will become apparent as the operation of the apparatus is described. The trip plate serves as a can operated control for the latch arm 66 in a manner for controlling the progression of the conveyor so as to automatically and sequentially bring the same in registry with the tiers of cans to be discharged, one after another.

The stop devices which cooperate with the latch arm 66 in controlling presentation of the conveyor or receiver in registry with the several tiers of cans, one after another, will now be described. An upper stop rod 76 is mounted in frame supports 77 and 78 in the manner clearly illustrated in Figure 4, and fixed stops 79 are adjustably secured on said rod in spaced relation, one said stop being disposed in association with each of the gate bars 35 or can tier stations. A lower stop bar 80 is secured to the frame standard 11 and to the frame support 77, and support blocks 81 are adjustably mounted thereon in spaced relation, one thereof being disposed beneath each of the previously mentioned stops 79. A lower stop 82 is pivoted as at 83 on each block 81, and said lower stops rest on support pins 84. It will be apparent by reference to Figures 11, 14, 15 and 16 that the right hand or stop ends of said lower stops are disposed slightly in advance of the stop ends of the upper stops 79, thereby to intercept the latch arm 66 in the manner illustrated in Figure 14 as the same is travelling toward the left as viewed in said figure before said latch arm reaches the position of the upper stop. The manner in which the upper and lower stops cooperate will be described in greater detail hereinafter.

Figures 9, 10, 11:
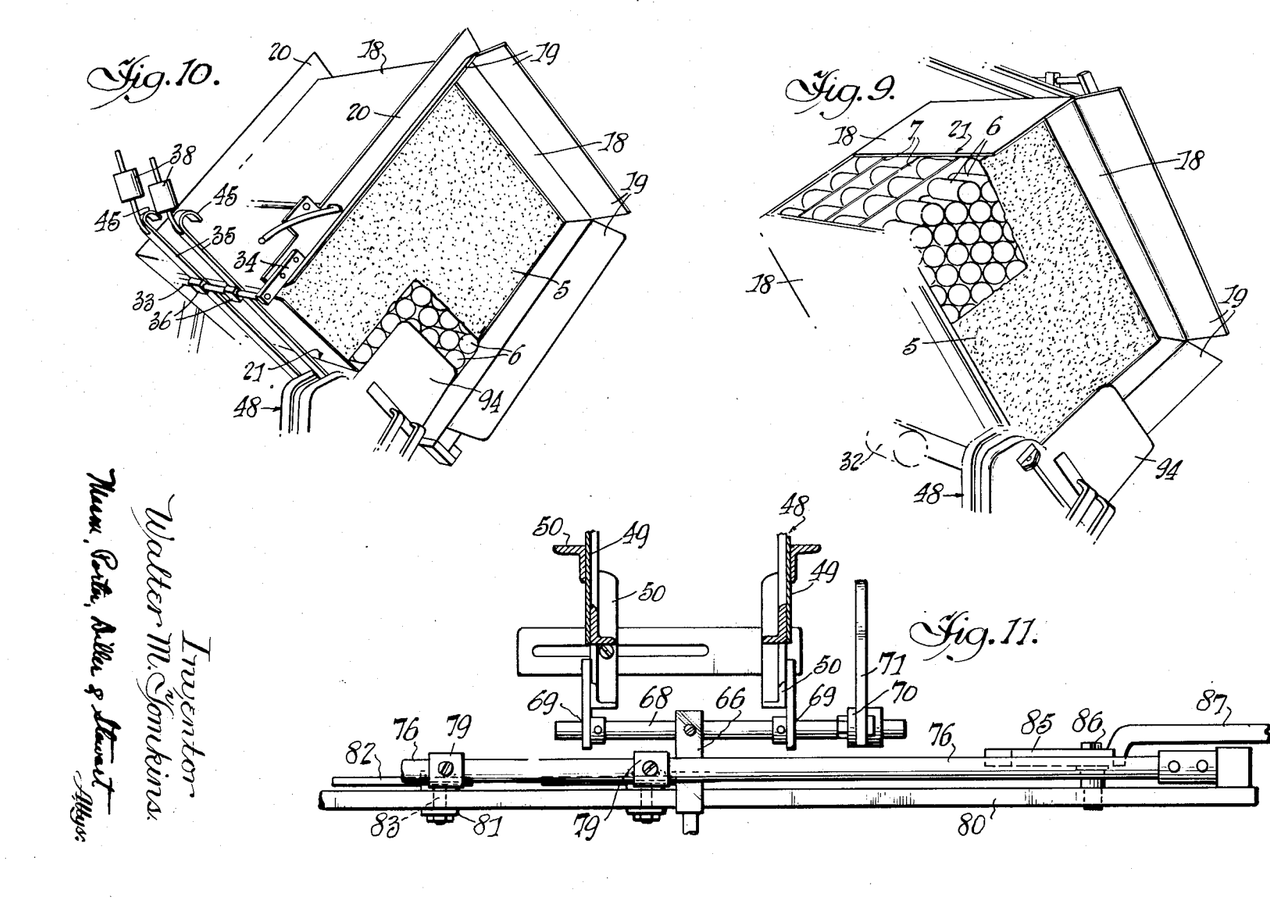
Figure 9 is a view similar to Figure 8, the bag being shown wholly inserted in the receiver and being partially torn away to expose portions of the multiple tiers of cans therein.
Figure 10 is a view similar to Figure 9 with the receiver and the partially torn bag swung down to the operative position of the receiver from which the tiers of cans are serially gravitated therefrom, the discharge gates now being in the can tier retaining or latched position.
Figure 11 is a fragmentary plan view and part horizontal section on the line 11—11 on Figure 4 showing a portion of the shiftable delivery chute, the latch, the latch rod and bar and the chute carriage retaining latch.

A hand latch 85 is provided and is pivoted as at 86 on the bar 80 in the manner illustrated in Figures 4 and 11. The latch 85 includes a handle extension 87 and is yieldably held in the raised position illustrated in Figure 4 by an anchored spring 88. The latch 85 is disposed to engage the latch arm 66 when the conveyor or carriage 48 is in its out-of-the-way or initial position illustrated in full lines in Figure 4. Thus the latch 85 overcomes the constant tendency of the counterweight 65 to move the conveyor or carriage 48 to the left, but it will be apparent that by lifting the handle 87 the latch 85 can be released to permit the carriage to move to the left until the latch arm 66 engages with the first of the lower stops 82 in the manner illustrated in Figure 14.

Attention is directed to Figures 3, 5, 6 and 7 from which it will be apparent that a latch rod 89 is pivoted at 90 in the reinforcing angles 20 of the receiver, and lies between limit pins 91 and is equipped with a counterweight 92 and a handle portion 93. By manipulation of the handle portion 93 the offset central portion of the latch rod may be moved within the limits provided by the pins 91. Whenever the bag receiver is in the bag receiving position shown in Figure 6 the latch rod 89 will engage with the hooked end extensions 45 of the gate bars 35 and hold them in the out-of-the-way position illustrated in said figure, and when the receiver is in the can discharging position shown in Figure 5 the latch rod will be out of contact with said hooked extensions so that the gate bars 35 will be free to swing out to the can tier releasing position shown in Figure 5 when the gate bar releasing latches are released by movement of the conveyor or carriage 48.

A follower flap or guide 94 is pivoted as at 95 on the conveyor or carriage 48 in the manner clearly illustrated in Figures 3, 7, 10 and 17. An anchored spring 96 connected as at 97 to the guide 94 serves to yieldably hold said guide in the upright position against the rigid stop bracket 98 which is fixed on the conveyor or carriage 48. The flap 94 moves along with the conveyor or carriage 48 as it is moved step-by-step for sequential registration with the several tiers of cans in the bag, and serves to guide the can ends which are exposed through the removed portion of the bag 5 in the manner illustrated in Figures 10 and 17.

Figures 7, 8:
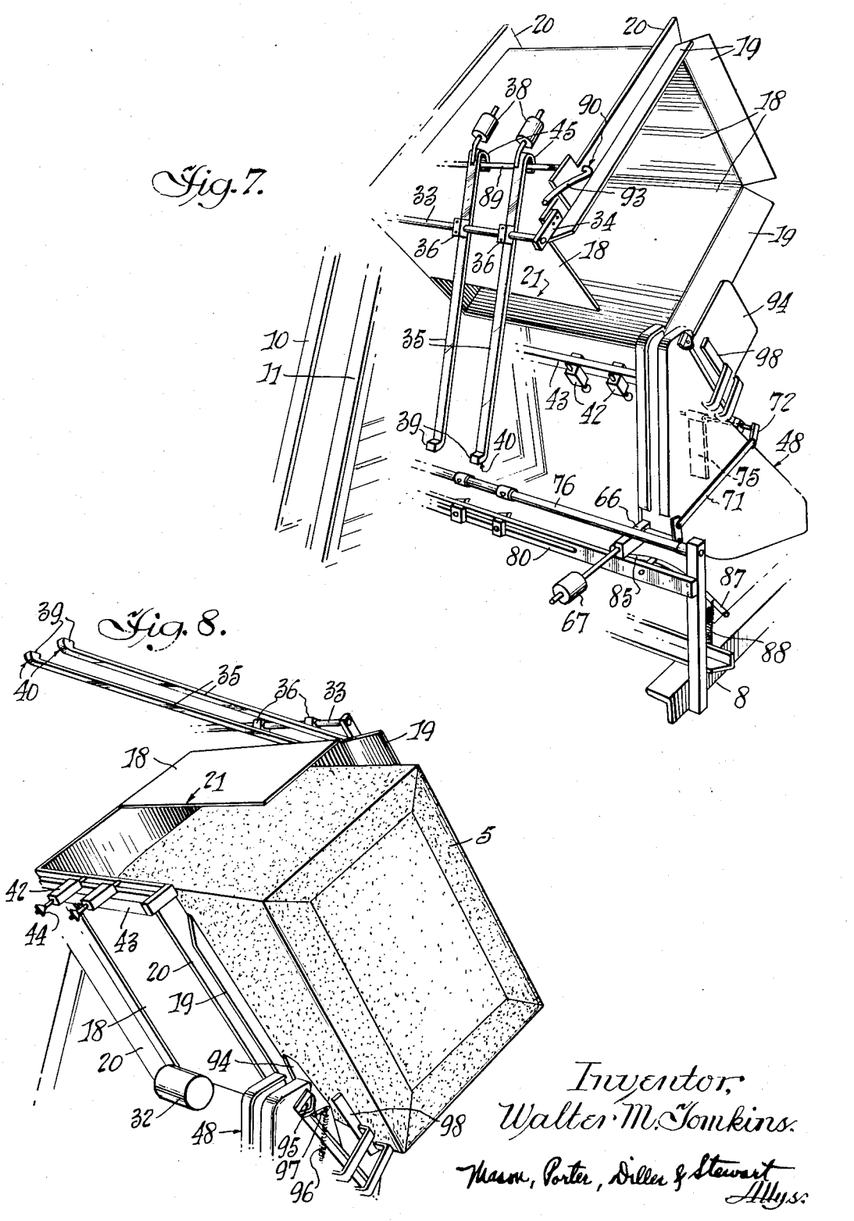
Figure 7 is a fragmentary perspective view looking into the front or receiving end of the bag receiver, the same being shown in the same position illustrated in Figure 5.
Figure 8 is a view similar to Figure 7 and showing the bag receiver swung up to its bag receiving position, as in Figure 5, a bag of cans being illustrated as partially inserted therein.

In the practical employment of the example form of apparatus disclosed herein, the bag receiver is placed in the position illustrated in Figures 8 and 9, that is with the discharge opening 21 presented upwardly. The bag of cans is then inserted in the receiver in the manner illustrated in Figure 8, and the follower or guide plate 94 may be readily displaced by the inwardly sliding bag in the manner illustrated. After the bag has been suitably inserted into the receiver in the manner illustrated in Figure 9 the guide flap 94 will swing up to its erect position shown in Figures 4 and 9. With the bag fully mounted in the receiver the portion of the bag exposed through the discharge opening 21 is torn away in the manner illustrated in Figure 9 to expose sides of the cans of the several tiers, and it will be noted that the axes of the cans are arranged in parallel relation and in such position that when they are discharged from the bag they will pass out through the discharge opening 21 in a direction perpendicular to their axes. By manipulating the handle 93 the latch rod 89 can be tripped to release the hooked end extensions 45 of the gate bars 35 so as to permit said gate bars to swing down and close over the discharge opening 21 of the receiver, the cam surfaces 40 of said bars engaging and displacing the securing latches 41 so that they can spring out behind the latch heads 39 and secure the latch bars in the can tier retaining position illustrated in Figure 13. The treadle 30 is now depressed to release the detent 24, and the receiver is turned from the bag receiving position shown in Figures 8 and 9 to the bag discharging position shown in Figures 3, 4, 7, 10 and 13. It is to be understood that at this time the conveyor or carriage 48 is in its out-of-the-way position illustrated in full lines at the right in Figure 4.

By now lifting the latch handle portion 87 the latch 85 can be depressed from its intercepting contact with the latch arm 66, and then the counterweight 65 will be effective to shift the conveyor or carriage 48 to the left, as viewed in Figure 4, until the latch arm comes against the first lower stop 82 in the manner illustrated in Figure 14. This serves to place the conveyor or receiver 48 in registration with the first of the gate bars 35, or in other words with the first tier of cans 6 in the bag 5. As the conveyor or receiver 48 moves into this first can tier registering position, or in other words as the latch arm 66 comes against the first lower stop 82, the latch releasing roller 60 will engage the first latch head 44 in the manner illustrated in Figure 13 and displace the latch 41 so as to permit the first gate bar 35 to swing down to the can tier releasing position.

When the first gate bar 35 is released, the first tier of cans 6 will pass out of the receiver by gravity action through the discharge opening 21 and into the conveyor or carriage 48. As the cans roll over the runners 55 in the conveyor they contact with and displace the trip plate 75 in the manner clearly illustrated in Figure 12 and will act through the crank and link connections 72, 71 and 70 to lift the latch arm 66 out of contact with the lower stop 82 and into conveyor intercepting contact with the associated upper stop 79 in the manner illustrated in Figures 12 and 15. Thus the conveyor or receiver will be retained in the previously described can tier registering position, but it will be noted that the latch arm is now intercepted in such position that it slightly overlies the effective end of the lower stop 82. Thus when the last can of the tier passes out of contact with the trip plate 75 in the manner illustrated in Figure 13, said plate will be released and will allow the latch arm 66 to fall. However, the latch arm now falls onto the upper surface of the lower stop 82 so that said lower stop will no longer be effective to hold the conveyor or carriage against movement. Hence the latch arm 66 will slide freely over the lower stop 82 in the manner indicated in Figure 16 so as to permit the conveyor or carriage to be moved over into registration with the second tier of cans, this second registering position being determined by contact of the latch arm 66 with the second lower stop 68. These operations of registering the conveyor or carriage 48 with the several tiers of cans and discharging said cans through said conveyor or carriage will be repeated automatically until the last tier of cans has been discharged, at which time the operator can return the carriage to its initial position illustrated in full lines in Figure 4, the latch 85 serving to retain said positioning of the conveyor or carriage while the receiver is being returned from its discharging position illustrated in Figure 7 to its bag receiving position illustrated in Figure 8. While the conveyor or carriage 48 is being moved to the right the latch arm 66 will pass freely over the tiltably mounted lower stops 82.

While one example of apparatus has been disclosed herein, it is to be understood that the particular form of this apparatus may be altered without departing from the spirit and scope of the invention as defined in the appended claims.

I claim:

1. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, there being included also a movable conveyor means for receiving the individual tiers of cans as they pass out by gravity action through the receiver wall opening, and means to change the position of and place the conveyor means to receive the successively released tiers of cans.

2. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, there being included also a movable conveyor means for receiving the individual tiers of cans as they pass out by gravity action through the receiver wall opening, and means to change the position of and place the conveyor means to receive the successively released tiers of cans, said last named means including means for moving the conveyor means along said wall opening, means for stopping the conveyor in alignment with each tier of cans, and means controlled by movement of cans through the conveyor for releasing the successively effective stops to permit the conveyor to move on to the next can tier registration after the last can of the preceding can tier has been discharged thereinto.

3. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, there being included also conveyor means for receiving the individual tiers of cans as they pass out by gravity action through the receiver wall opening, and means to place the conveyor means to receive the successively released tiers of cans, and conveyor movement controlled means for bringing about the progressive removal of the wall opening closure means and the successive release of the can tiers.

4. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, said receiver being tiltably mounted so as to be movable between a can bag receiving position in which the wall opening is directed upwardly to facilitate bag placement and the removal of the bag portion, and there also being included a can discharging position in which said opening is directed downwardly to facilitate the discharging of the cans by gravity action.

5. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, said receiver being tiltably mounted so as to be movable between a can bag receiving position in which the wall opening is directed upwardly to facilitate bag placement and the removal of the bag portion, and there also being included a can discharging position in which said opening is directed downwardly to facilitate the discharging of the cans by gravity action, said receiver being pivotally supported at one end only, the other end being open and free to receive can bags.

6. In apparatus for unloading cans from a bag wherein the cans are arranged in multiple independent tiers and with their axes in parallel relation, a receiver in which to receive the bag of cans and having a wall opening through which the sides of cans of the several tiers are exposed by removal of at least a portion of the bag, the axes of the cans being disposed in generally horizontal position, and wall opening closure means normally closing over said wall opening to retain cans within the receiver and progressively removable to release the cans to pass by gravity action through said wall opening one tier at a time, said receiver being tiltably mounted so as to be movable between a can bag receiving position in which the wall opening is directed upwardly to facilitate bag placement and the removal of the bag portion, and a can discharging position in which said opening is directed downwardly to facilitate the discharging of the cans by gravity action, said receiver being pivotally supported at one end only, the other end being open and free to receive can bags, and there also being included conveyor means for receiving the individual tiers of cans as they pass out by gravity action through the receiver wall opening, means for moving the conveyor means along said wall opening, means for stopping the conveyor in alignment with each tier of cans, can movement controlled releasing means for releasing the successively effective stops to permit the conveyor to move on to the next can tier registration after the last can of the preceding can tier has been discharged thereinto, and a follower and guide plate movable with the conveyor to lie close to cans of each tier as they are being discharged, said follower being yieldably mounted and tiltable toward the receiver to permit the passage of a can bag thereover as it is being placed in the receiver.

7. In apparatus for unloading cans from a bag wherein the cans are arranged in multiple independent tiers and with their axes in parallel relation, a receiver in which to receive the bag of cans and having a wall opening extending along one side thereof through which the sides of the several tiers of cans are exposed by removal of at least a portion of the bag, the axes of the cans being disposed in generally horizontal position and the receiver being tiltably mounted so as to be movable between a can bag receiving position in which the wall opening is directed upwardly and a can discharging position in which the wall opening is directed downwardly, gate members swingably supported on the receiver and traversing the wall opening one opposite each tier of cans in the receiver, means constantly tending to swing the gates away from the wall opening when the receiver is in the discharging position, a latch means for holding each gate member in closed position over the wall opening, a can discharging conveyor movable along the receiver for receiving individual tiers of cans as they gravitate through the wall opening, means constantly tending to move the conveyor in one direction along the wall opening, stop means for arresting the movement of the conveyor as it comes into registry with each tier of cans, means on the conveyor for releasing the respective gate latch as the conveyor comes to rest in registry with each can tier, and can movement controlled means for releasing each stop means as the last can of a given tier passes through the conveyor to permit the conveyor to move into registry with the next tier of cans.

8. Apparatus as defined in claim 7 in which there are included means for counterbalancing the receiver so as to facilitate movement thereof between can bag receiving and can discharging positions, and manually operable latch means for holding the gates away from the receiver wall opening when the receiver is in the bag receiving position to facilitate placement of the bag and the removal of a portion thereof to expose the can sides of multiple tiers of cans.

9. Apparatus as defined in claim 7 in which there is included a guide plate mounted on and movable with the conveyor in position for lying close to and guiding cans of each tier as they are being discharged, said follower being movable through the receiver wall opening and yieldably mounted and tiltable toward the receiver so as to permit the free passage of a can bag thereover as it is being placed in the receiver when the receiver is in the bag receiving position.

10. Apparatus as defined in claim 7 in which the stop means includes a lower pivoted stop detent associated with each can tier position and engageable as a stop by the conveyor when moving in one direction and displaceable by said conveyor when moved in the opposite direction, and an upper fixed stop overlying and spaced slightly beyond each lower stop, a latch arm pivotally mounted on the conveyor in position for engaging with said lower and upper stop sets, and means on the conveyor in position for being engaged by cans being discharged through the conveyor and connected with said latch arm for lifting the same out of contact with a lower stop and into conveyor stopping contact with the associated upper stop, and for allowing the latch arm to fall down on and slide freely over the respective lower stop as the last can of the tier being discharged passes on in the conveyor to free said latch arm from both the upper and lower stops of the particular set and permit the conveyor to move on into register with the next tier of cans.

11. Apparatus as defined in claim 7 in which the conveyor includes a chute of a width for receiving only one can length and mounted on rollers rollable over supporting tracks, said chute having a receiving mouth movable along the receiver wall opening in close proximity for receiving cans therefrom.

References Cited in the file of this patent

UNITED STATES PATENTS

| | | |
|---|---|---|
| 348,164 | Judson | Aug. 24, 1886 |
| 1,367,061 | Lewis | Feb. 1, 1921 |
| 1,431,702 | Smend | Oct. 10, 1922 |
| 1,906,126 | Mott | Apr. 25, 1933 |
| 1,954,944 | Olney | Apr. 17, 1934 |
| 2,452,927 | Hammen | Nov. 2, 1948 |
| 2,513,076 | Blasiola | June 27, 1950 |